J. LANGE.
GATE AND HINGE.
APPLICATION FILED NOV. 10, 1921.
1,425,986.
Patented Aug. 15, 1922.
2 SHEETS—SHEET 1.
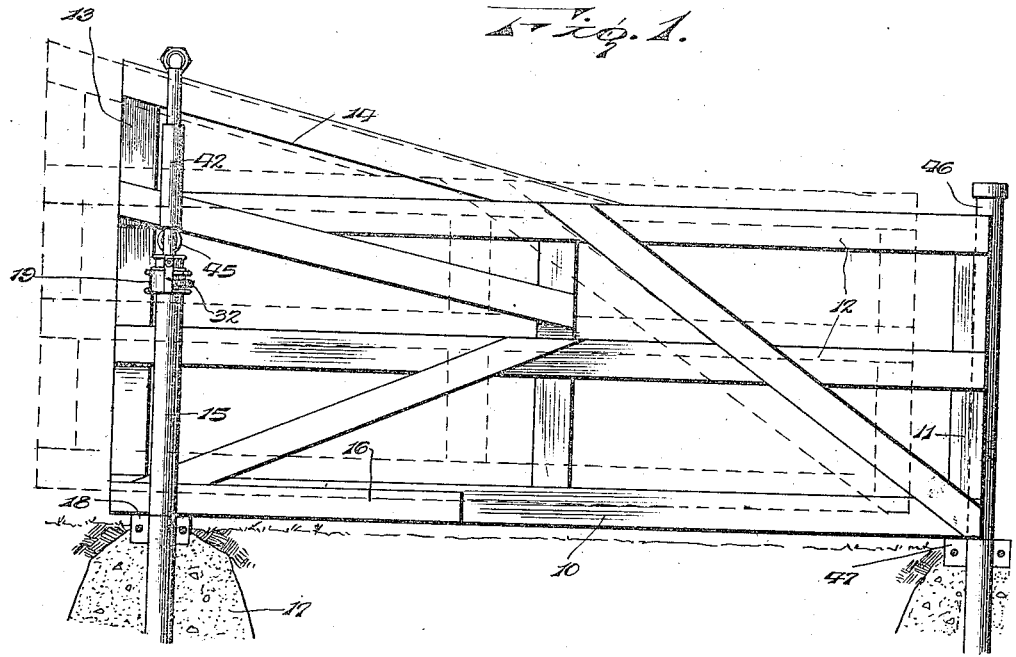
Fig. 1.
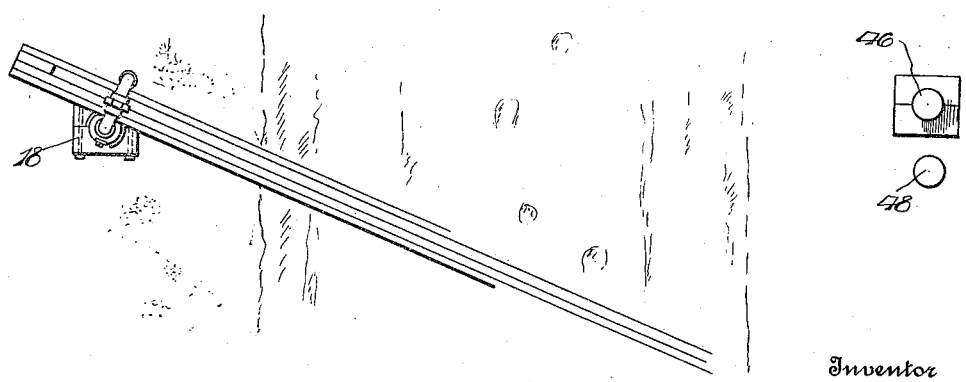
Fig. 2.
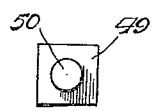
Inventor
Jacob Lange.
By *Lacey T Lacey*, Attorneys

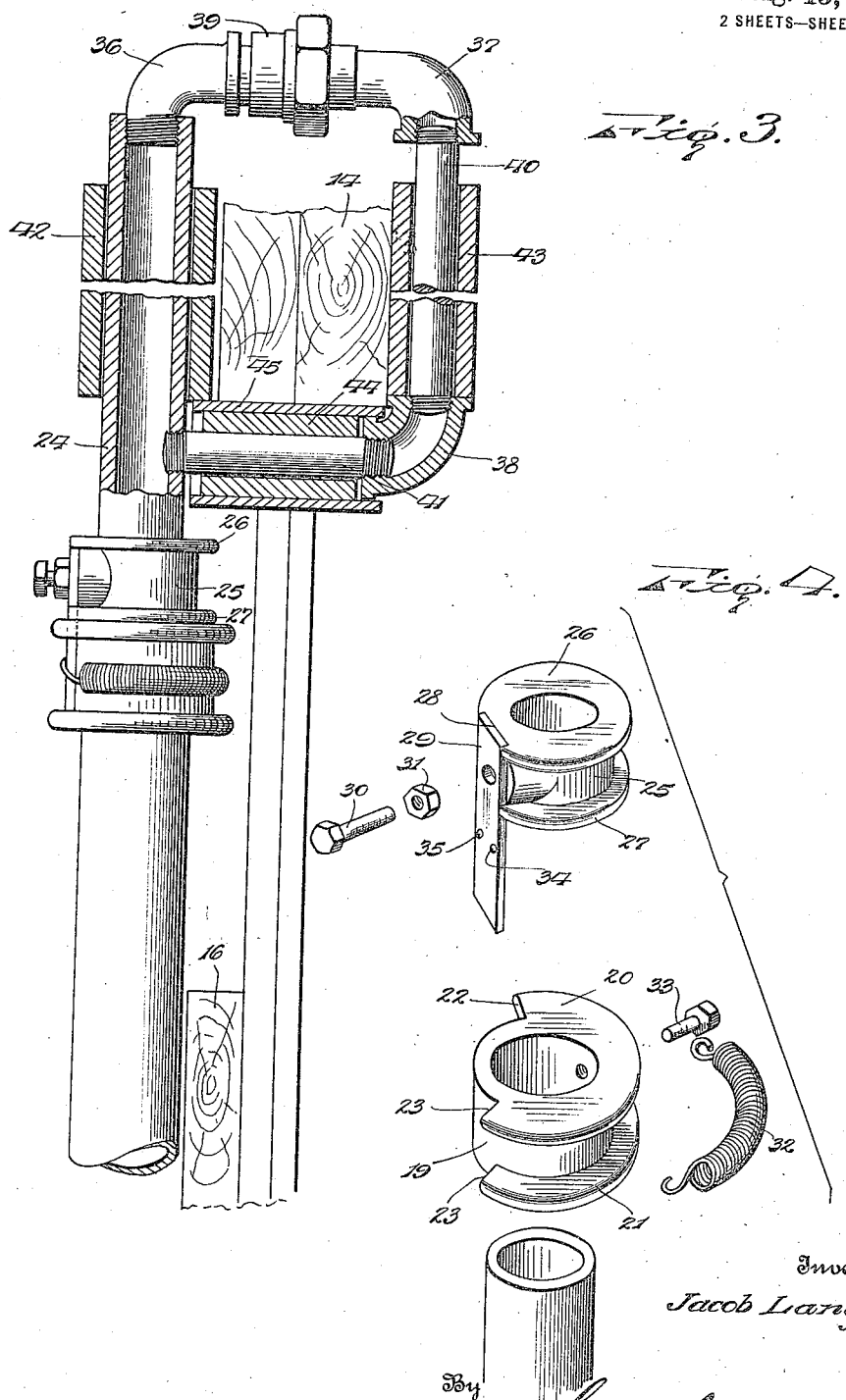

UNITED STATES PATENT OFFICE.

JACOB LANGE, OF JACKSON, MICHIGAN.

GATE AND HINGE.

1,425,986. Specification of Letters Patent. Patented Aug. 15, 1922.

Application filed November 10, 1921. Serial No. 514,284.

*To all whom it may concern:*

Be it known that I, JACOB LANGE, a citizen of the United States, residing at Jackson, in the county of Jackson and State of Michigan, have invented certain new and useful Improvements in Gates and Hinges, of which the following is a specification.

My invention relates to gates in general and more particularly to gates that have a combined translating and swinging motion for opening or closing the same.

One object of this invention is to so construct the gate, that it will first rise from the ground and run a short distance in lateral direction before swinging into open position.

Another object is to provide a gate hinge, which is part of the gate post itself and acts to assist in closing the gate.

Still another object of the invention is to provide antifriction means to facilitate the operation of the gate and to make it practically self-closing.

In the accompanying drawings one embodiment of the invention is illustrated; and Figure 1 shows a front elevation of the gate in closed position;

Figure 2 is a top plan view with the gate half open;

Figure 3 is a side view partly in section of the gate post and the hinge drawn in larger scale; and Figure 4 is a perspective view of some of the details forming part of the post and hinge of the gate.

The gate is denoted by the numeral 10 and is constructed in the usual manner by uprights 11 and longitudinal straps 12. The uprights 13 at the hinge end of the gate are extended upwardly and form a projecting portion for the parallel slats 14 connecting the same with the upper part of the gate, these slats 14 running at an inclination of about 30° to form tracks, upon which the gate is rolled back in opening. In order to keep the gate at a uniform distance at the top and bottom from the post 15, the gate is provided with reinforcements 16 on the side nearest the post. The function of these reinforcements is to hold the gate in upright position while it is being moved and to prevent the straps 12 to catch in projecting parts of the post 15.

The hinge post 15 is anchored in the ground preferably in a block of cement 17 and the post is provided with a wooden or metallic block 18 bolted to the post and protruding slightly above the ground to form a resting block for the gate when closed. The post 15 is preferably made of an iron pipe and has at its top edge a sleeve 19 securely fastened thereon or made integral therewith. This sleeve has a top and bottom collar 20 and 21 running about three-quarters of the circumference of the sleeve so as to form abutment faces 22 and 23.

In the hollow of the tubular post 15 is inserted a pivot 24, which extends sufficiently far down into the post 15 to give a good bearing for supporting the gate. The pivot is provided with a collar 25 forming part thereof or being rigidly secured thereto and this collar rests upon the top of the sleeve 19 so as to be supported in the length direction thereof. Similarly to the sleeve 19 this collar has a pair of flanges 26 and 27 which are dove-tailed as at 28 for receiving a perpendicular arm 29 secured on the collar by means of a bolt 30 and lock nut 31. This arm extends far enough down to be able to engage both of the collars 20 and 21 on the sleeve 19 and to contact with the abutments 22 and 23 to limit the turning movement of the pivot 24 in the post 15. This turning movement is generally about 90° which is the usual amount of swinging the gate to open it.

A coil spring 32, which at one end fastens to the sleeve 19 by means of a bolt 33, is at the other end hooked into an aperture 34 on the arm 29. The spring 32 folds around the cylindrical surface of the sleeve 19 between the two collars 20 and 21 and tends to hold the gate against abutments 23 if the spring is hooked to the aperture 34 and to hold it against the abutments 22 in case the spring is hooked to the aperture 35 in arm 29, thereby making the gate open either right hand or left hand.

The pivot 24 is provided with a loop at its upper end forming a rectangular opening; this loop is preferably constructed from pipe elbows 36, 37 and 38 and pipe union 39 and rods 40 and 41 which are all screwed together, the pivot 24 and the rod 40 being provided with upright rollers 42 and 43 respectively and the rod 41 having a bushing 44 carrying a roller 45 around it.

The track formed by the slats 14 now fits in the opening formed between the rollers 42, 43 and 45 and is guided thereby, when the gate is being pushed back, the roller 45 causing the gate to rise upon contact with the under side of the track 14.

At the free end of the gate is provided another post 46 anchored in the ground in the same manner as the post 15 and provided with a block 47 upon which the end of the gate rests, when the gate is closed. As best seen in Figure 1, the gate is somewhat wider than the roadway, so that the end thereof engages along the entire height of the post 46, and a short post 48 may be provided near the post 46 so that the end of the gate is engaged between these two posts and cannot be opened in either direction without first sliding laterally out of engagement with these two posts. When the gate is closed the ends thereof rest on the blocks 18 and 47 so that it will not touch the ground.

The gate is operated in the following manner:

In order to open the gate it has first to be pushed about half way over toward the left, as seen in Figure 1, so as to disengage from the two posts 46 and 48 when it will at the same time ride up along the inclined track 14 upon the roller 45, so as to be raised from the ground, passing the approximate position indicated by dotted lines in the same figure. The gate can now be swung into open position and, when fully opened, it is again permitted to slide down the inclined track, until it rests on the block 18 and another block 49 is placed in suitable position parallel to the roadway for the free end of the gate to rest upon. When swinging the gate open the spring 32 is being stretched, so that, when the gate is again pushed back slightly and raised from the blocks 18 and 49, the spring will assist in closing the gate. The block 49 is preferably provided with a short stop 50 to prevent the gate from swinging beyond the 90° opening angle, as the swinging might otherwise unduly strain the spring and the arm 29.

The gate may also be secured in open position by providing a hook thereon for holding it against the stop 50.

Having thus described the invention what is claimed as new is:

1. The combination with a gate having an inclined track formed in the hinge end thereof; of a gate post, a vertical pivot on said post, a collar on said pivot for supporting the pivot on said post, an arm rigidly attached to said collar and stops on said post for said arm adapted to limit the turning of said pivot on said post, a spring acting between said arm and said post in the direction of closing the gate, and means on said pivot engaging said track, whereby the gate may be given a limited lateral movement before being swung open.

2. The combination with a gate having an inclined track formed in the hinge end thereof; of a gate post, a vertical pivot on said post, a collar on said pivot for supporting the pivot on said post, an arm rigidly attached to said collar and stops on said post for said arm adapted to limit the turning of said pivot on said post, a spring acting between said arm and said post in the direction of closing the gate, and means on said pivot engaging said track, whereby the gate may be given a limited lateral movement before being swung open, said means including horizontal and vertical rollers and said post being provided with a stop upon which the gate is adapted to rest in its extreme open and closed positions.

In testimony whereof I affix my signature.

JACOB LANGE. [L. S.]